United States Patent [19]

Niwa et al.

[11] Patent Number: 5,636,976
[45] Date of Patent: Jun. 10, 1997

[54] TIP SEAL FOR SCROLL TYPE COMPRESSOR AND MANUFACTURING METHOD THEREFOR

[75] Inventors: Kosaburo Niwa; Toshio Egami; Teruo Abe, all of Nagoya, Japan

[73] Assignee: Daido Metal Company Ltd., Nagoya, Japan

[21] Appl. No.: 547,729

[22] Filed: Oct. 26, 1995

[30] Foreign Application Priority Data

Nov. 16, 1994 [JP] Japan .................................. 6-308263

[51] Int. Cl.$^6$ ............................... F04C 18/04; F04C 27/00
[52] U.S. Cl. .......................................................... 418/55.4
[58] Field of Search ................................. 418/55.4, 142

[56] References Cited

U.S. PATENT DOCUMENTS 3,994,636 11/1976 McCullough et al. ................. 418/55.4
5,364,247 11/1994 Fukanuma et al. ..................... 418/55.4

FOREIGN PATENT DOCUMENTS 50-32512  3/1975  Japan .
55-81296  6/1980  Japan .
4-262087  9/1992  Japan .
6-137285  5/1994  Japan .

*Primary Examiner*—John J. Vrablik
*Attorney, Agent, or Firm*—Browdy and Neimark

[57] ABSTRACT

One or two submarine gates 23 are located at portions of a mold corresponding to one or both ends of a tip seal to be molded. Synthetic resin is injected through the submarine gates 23. When the mold is opened after the synthetic resin is solidified, a molded product is cut off and separated by shearing from a runner 22 at a tip 23a of each of the submarine gates 23. Thus, no convex portion is formed as a gate trace on the end of the tip seal as a molded product when it is cut off. When the tip seal having no convex portion on the end thereof is inserted into the mounting groove of a scroll type compressor, the tip seal exhibits an excellent sealing property. With the aforesaid method, a tip seal excellent in a sealing property can be easily manufactured.

2 Claims, 4 Drawing Sheets

TIP SEAL FOR SCROLL TYPE COMPRESSOR AND MANUFACTURING METHOD THEREFOR

BACKGROUND OF THE INVENTION

1. Field of the Invention

The present invention relates to a tip seal for sealing used in a scroll member of a scroll type compressor and a manufacturing method of the tip seal.

2. Description of the Related Art

As shown in FIG. 5, a scroll type compressor is arranged such that a fixed scroll member $A_0$ and a movable scroll member $A_1$ are paired and disposed by being engaged to each other in a state that a standing wall B having an involute curve is disposed on the base of the scroll member $A_1$ and the space between the standing walls B is used as a compression groove (compression chamber) D. Thus, a fluid is compressed in the compression chamber D, which is surrounded by both scroll walls, by eccentrically revolving the movable scroll member $A_1$. In the scroll type compressor, a mounting groove C is formed along the top of the standing wall B and a long scroll-shaped tip seal 60 for sealing is fitted in the mounting groove C, as shown in JP-A-50-32512, JP-A-55-81296 and the like. The tip seal 60 is in compression contact with each of the confronting scroll members $A_0$ and $A_1$, that is, the tip seal 60 is in sliding compression contact with the top and bottom surfaces of the compression groove D defined by the scroll members $A_0$ and $A_1$ and is in compression sealing contact with the mounting groove C so that the compression chamber can be hermetically sealed to maintain the airtightness thereof.

Since the tip seal serves as a sealing-device by being fitted in the mounting groove C, it has a slender scroll shape and is made by injection molding. A conventional method of manufacturing the tip seal is disclosed in JP-A-4-262087, in which a synthetic resin is supplied up to both ends of a mold for a scroll-shaped tip seal by providing a side gate, through which the synthetic resin is to be injected, on a side of the mold for the tip seal at the substantially intermediate portion of the entire length thereof.

When the manufacturing method in which the gate is provided on the side of the mold for the tip seal at a substantially intermediate portion of the entire length thereof is employed, a convex portion m is formed as a gate trace on a side of a tip seal 60 as a molded product as shown in FIG. 6, by which an intimate contact property between the tip seal 60 and the side of the mounting groove C is prevented, so that a sealing property is lowered. To solve this problem, the tip seal is made by injection molding with a side gate provided at a portion which is an outside end of a mold for a scroll-shaped tip seal in a method disclosed in JP-A-6-137285, so that a sealing property of the tip seal is improved by preventing the formation of a gate trace on a side of the tip seal.

In the method disclosed in JP-A-6-137285, however, since the side gate is provided at the portion of the mold corresponding to the outside end of a scroll-shaped tip seal when manufacturing the tip seal by injection molding, the tip seal is molded integrally with a runner through the gate. Thus, not only a process for cutting off the runner is needed but also a convex portion n of 1–2 mm is formed on the outside end of the tip seal as a gate trace when the runner is cut off as shown in FIG. 1 (FIG. 7 of the present application) of the published application of the prior art. To fit the tip seal in which the convex portion n is formed in the mounting groove C as it is, the tip seal 60 must be shortened by the size of the convex portion n, thus a sealing property at the portion is lowered and a compressing performance of a compressor cannot be increased. Further, when the gate is provided on the end of the center side (on a high pressure side) of the mold for the tip seal, whereby the compression performance is greatly lowered, thus the gate must be disposed on the outer end of the mold. Further, when executing the process of removing the convex portion n, since the tip seal 60 has a slender shape and elasticity as a whole and has an involute curve, it is difficult to set the tip seal 60 at a predetermined position and thus the process for removing it leads to a great expense.

Here, and in the following claims the term "submarine gate" is defined as follows; It is a kind of tunnel gate provided in a mold wall for injection molding and transfer molding. Molten resin from a runner of the mold passes below the parting line thereof and is injected through the submarine gate into a cavity of the mold from the position right above an edge of the cavity of the mold.

An object of the present invention is to easily manufacture a tip seal excellent in a sealing property without a convex portion caused by a gate trace by providing a submarine gate at the portion of the molding cavity of a mold for molding the end of a tip seal main body and injecting a synthetic resin through the submarine gate.

SUMMARY OF THE INVENTION

Accordingly, there is provided a tip seal for a scroll type compressor to seal a compression chamber, which has a scroll shape of an involute curve and is fitted in a mounting groove formed on a scroll main body of the compressor, the tip seal being produced by injecting synthetic resin into a mold through one or two submarine gates which are located at portions of the mold corresponding to one or both ends of the tip seal to be molded.

Accordingly, there is provided a method of injection molding of a tip seal for a scroll type compressor having a scroll shape of an involute curve, wherein the tip seal is produced by injection molding method in which synthetic resin is injected into a mold through one or two submarine gates which are located at portions of the mold corresponding to one or both ends of the tip seal to be molded.

Since the submarine gates are provided at the portions of the mold corresponding to one or both ends of the tip seal to be molded, no convex portion caused by a gate trace is formed on a side of the tip seal. Further, the gates are arranged as the submarine gates, the tip seal without the convex portion caused by the gate trace can be obtained without the need of a post-processing of the submarine gates.

As described above, according to the invention, since the synthetic resin is injected through the submarine gates provided at the portions of the mold corresponding to one or both ends of the tip seal to be molded, the tip seal excellent in a sealing property and capable of increasing a compression efficiency of the scroll type compressor can be easily manufactured.

DESCRIPTION OF PREFERRED EMBODIMENT

An embodiment of the present invention will be described with reference to FIG. 1 to FIG. 4.

Figure 1:
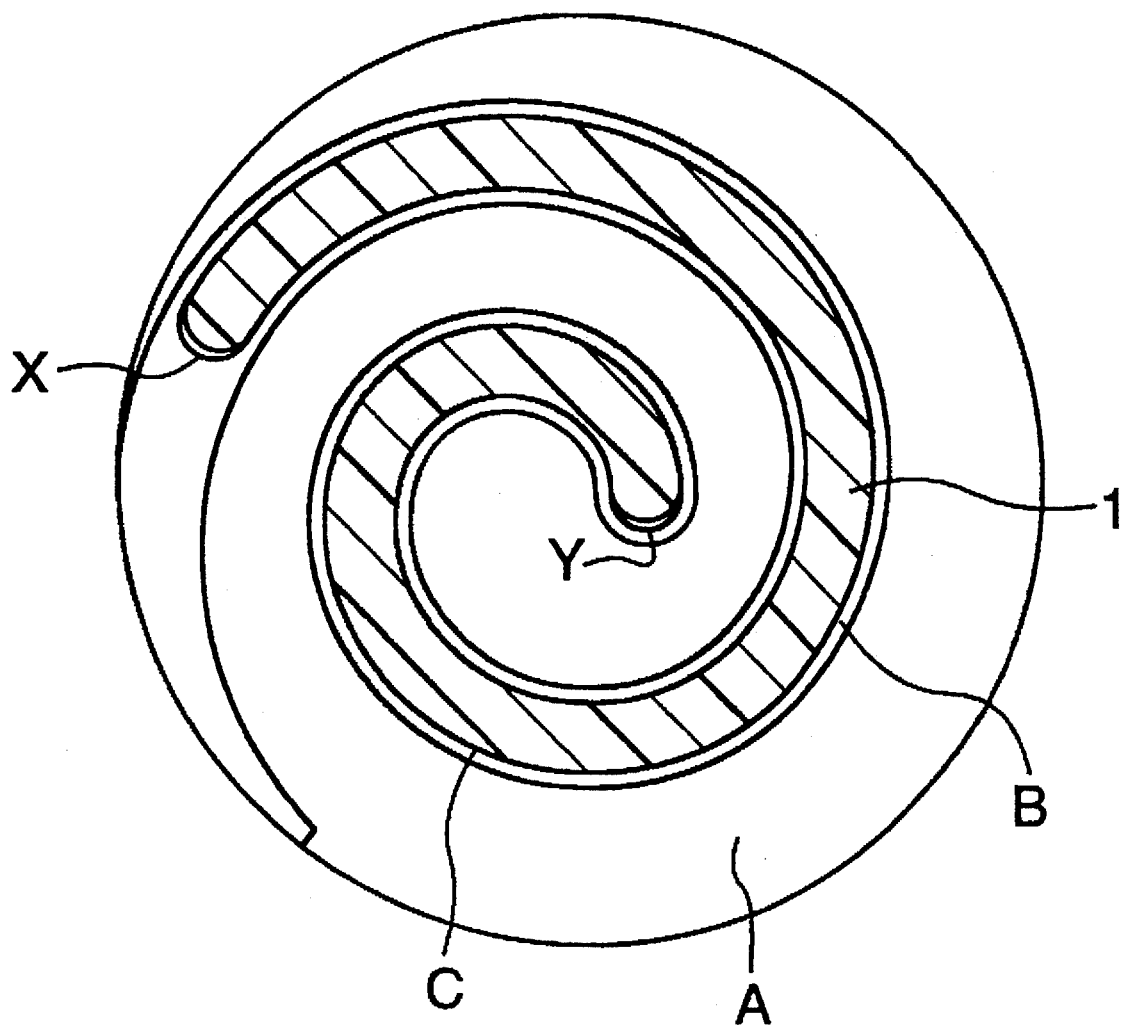
FIG. 1 is a plan view of a scroll member in a state that a tip seal is inserted.

As shown in the hatched portion of FIG. 1, a slender scroll-shaped mounting groove C of an involute curve with a rectangular cross section is disposed along the top of the standing wall B of a scroll member A in a scroll type compressor. A tip seal 1 has a scroll shape which follows the mounting groove C so as to be fitted in the mounting groove C. The tip seal 1 is made by injecting a synthetic resin which is prepared by mixing, for example, a polyphenylene sulfide resin (PPS) with other synthetic resin and the like and is excellent in fluidity as well as also excellent in wear-resistance and a sliding property when it is molded.

Figure 2:
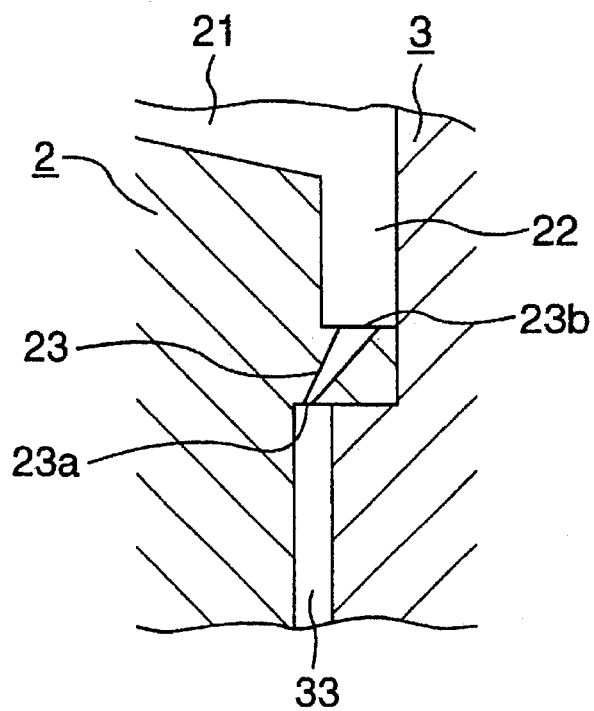
FIG. 2 is an enlarged cross sectional view of a portion of a mold when it is closed.

FIG. 2 shows a portion of a mold of an injection molding machine for molding the tip seal 1. The mold comprises a pair of a fixed mold 2 and a movable mold 3. The fixed mold 2 is connected to a not shown injection device for melting and injecting the synthetic resin. The fixed mold 2 has a spool 21. A runner 22 is continuously branched from the spool 21. A conical submarine gate 23 which is adapted to be tapered toward a tip thereof is formed at the extreme end of the runner 22.

Figure 3:
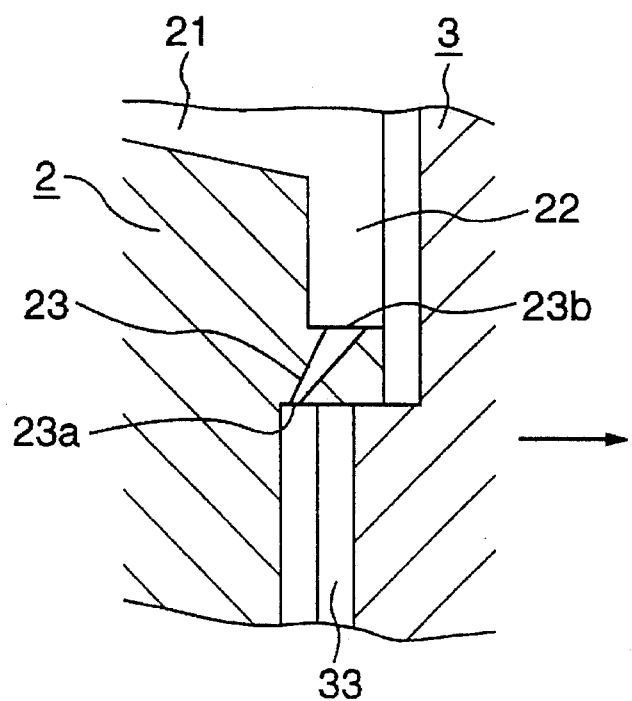
FIG. 3 is an enlarged cross sectional view of a portion of the mold showing a mold opening process.

The movable mold 3 has a molding cavity 33 of a scroll-shaped groove for molding the tip seal 1. The tip 23a of the aforesaid submarine gate 23 is opened to the extreme end (corresponding to the outside end X of the tip seal) of the molding cavity 33. The submarine gate 23 has a diameter of 1.2 mm on the runner side 23b thereof and a small diameter of 0.4 mm on the tip side 23a thereof. Then, the synthetic resin is injected and filled into the molding cavity 33 from the injection device in a state that the mold is closed, and the mold is opened after the synthetic resin is solidified. Once the movable mold 3 is separated from the fixed mold 2 at the time, the tip seal 1 as a molded product is adhered to the movable mold 3 and then is cut off and separated from the extreme end 23a of the submarine gate 23 by shearing as shown in FIG. 3. As a result, a convex portion as a gate trace is not formed on the tip seal 1 side and a cut trace having a rough surface caused by the shearing effected when the mold is opened remains slightly on the tip seal 1.

Figure 4:
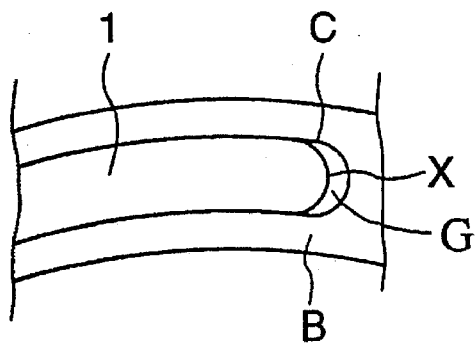
FIG. 4 is a plan view showing the outside extreme end of a mounting groove.
Figure 7:
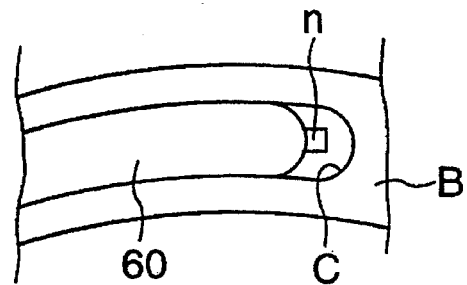
FIG. 7 is a partial plan view showing the prior art.
Figure 6:
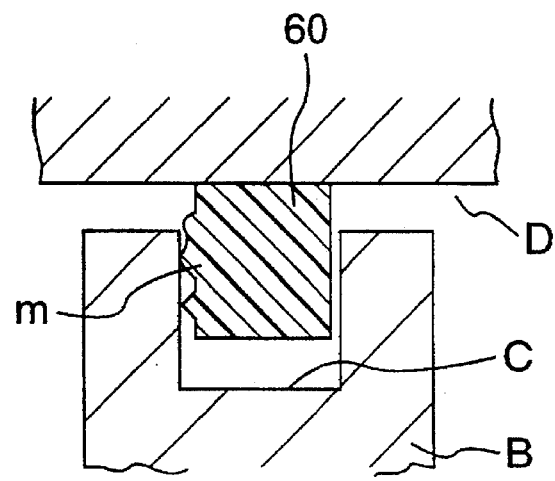
FIG. 6 is a cross sectional view of a portion of a scroll member.
Figure 5:
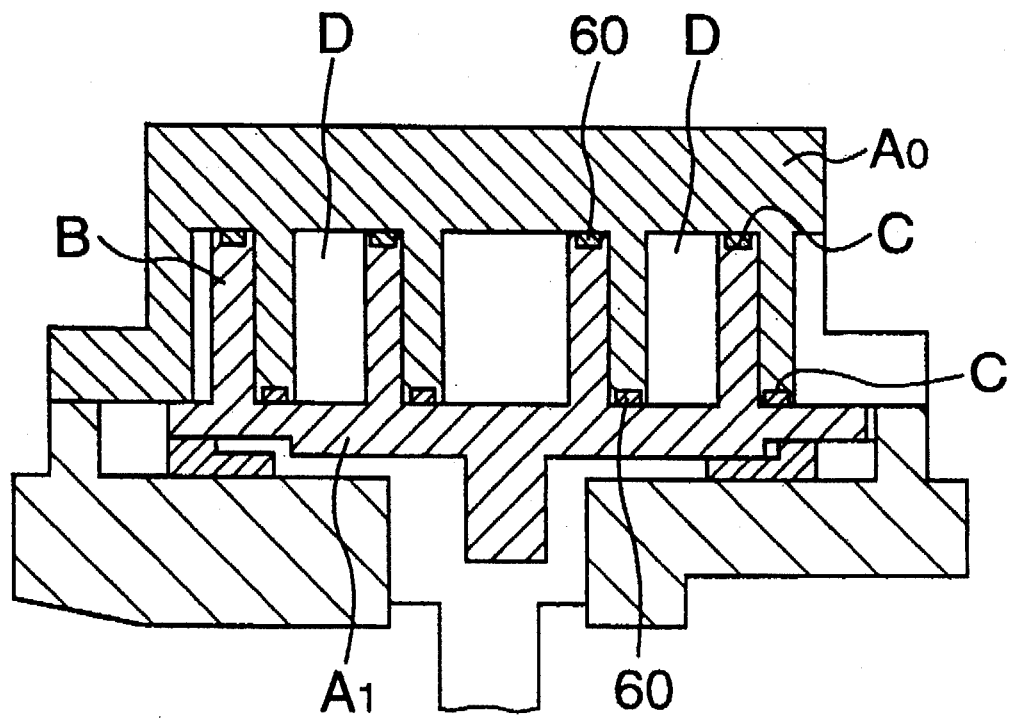
FIG. 5 is a schematic cross sectional view of a scroll type compressor.

As shown in FIG. 4, since the thus molded tip seal 1 has a slightly shorter length than that of the mounting groove C of the scroll member A, it can be easily inserted into the mounting groove C. Consequently, the length of the tip seal 1, which was conventionally set shorter to fit its convex portion caused by a gate trace G formed at the outside end thereof, can be increased, whereby a reliable sealing can be ensured at the lengthened portion.

Although this embodiment shows an example in which one or two submarine gates 23 are located at portions of the mold corresponding to one or both ends of the tip seal to be molded, the submarine gates 23 need not always be located at portions of the mold corresponding to one or both ends of the tip seal to be molded but may be located at a portion of the mold corresponding to an inside end Y located in a high pressure side of the scroll type compressor as shown in FIG. 1 for convenience of design of the mold. Further, the submarine gates 23 may be located at portions of the mold corresponding to both the outside and inside ends X, Y of the tip seal to be molded so as to easily mold a large tip seal.

What is claimed is:

1. In an injection-molded tip seal to be fitted into a mounting groove for sealing a scroll compressor compression chamber having a scroll shape of an involute curve, the shape including an end; the improvement comprising:

a gate trace disposed at the end; and the gate trace being non-convex and including a sheared rough surface.

2. The improvement according to claim 1, wherein the gate trace is produced by a submarine gate.

* * * * *